United States Patent [19]

Suzuki et al.

[11] 4,325,623
[45] Apr. 20, 1982

[54] SHUTTER SPEED DISPLAY DEVICE

[75] Inventors: Koji Suzuki, Asaka; Eiichi Tano, Kamifukuoka, both of Japan

[73] Assignee: Asahi Kogaku Kogyo Kabushiki Kaisha, Tokyo, Japan

[21] Appl. No.: 198,997

[22] Filed: Oct. 21, 1980

[30] Foreign Application Priority Data

Nov. 30, 1979 [JP] Japan .................................. 54/155174

[51] Int. Cl.³ .............................................. G03B 17/20
[52] U.S. Cl. ........................................ 354/289; 354/53
[58] Field of Search ................ 354/23 D, 60 L, 60 A, 354/289, 53

[56] References Cited

U.S. PATENT DOCUMENTS 4,081,805  3/1978  Takahashi ......................... 354/60 L
4,095,243  6/1978  Numata et al. .................... 354/53 X
4,096,494  6/1978  Kawasaki et al. ............. 354/60 L X
4,172,645  10/1979  Tokutomi ............................. 354/53

Primary Examiner—Michael L. Gellner
Attorney, Agent, or Firm—Sughrue, Mion, Zinn, Macpeak & Seas

[57] ABSTRACT

A shutter speed display device for a camera in which light emitting diodes are arranged in a viewfinder of the camera with one light emitting diode corresponding to each of a plurality of shutter speed indicating numerals. The light emitting diodes are connected in a matrix format and driven in a time division manner so that one or more of the light emitting diodes can be simultaneously activated so as to display both the selected shutter speed and to indicate whether the picture would be under-exposed or over-exposed. In one embodiment, both the shutter indicating light emitting diode and the under-exposure and over-exposure diodes are switched on and off at a high rate of speed so that their light output appears to be stable to the operator. In a second embodiment, the light emitting diodes for indicating the under-exposure and over-exposure conditions are made to flicker.

8 Claims, 9 Drawing Figures

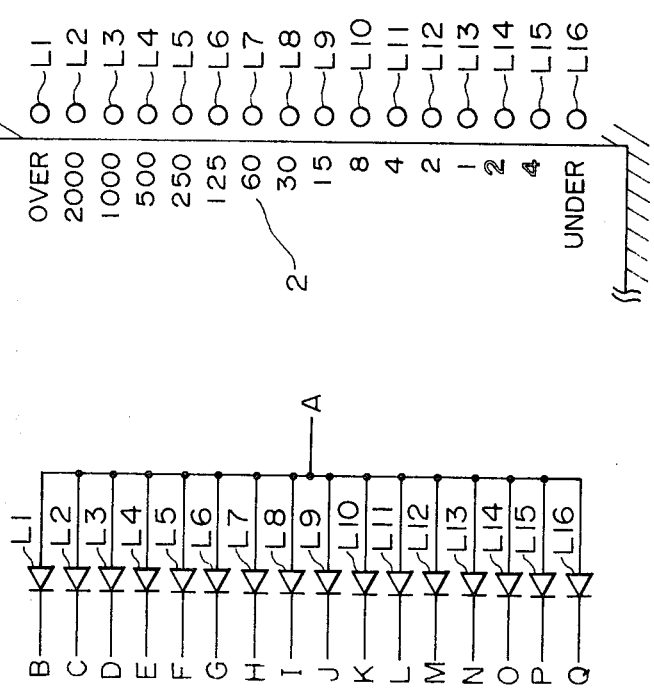

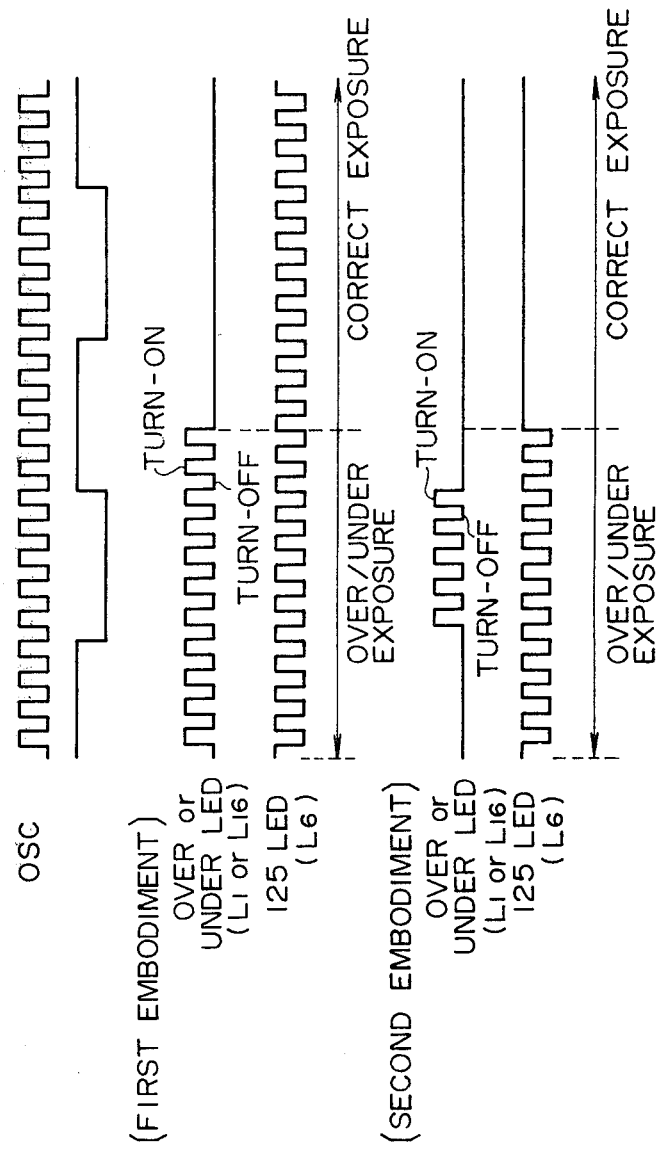

SHUTTER SPEED DISPLAY DEVICE

BACKGROUND OF THE INVENTION

The present invention relates to a shutter speed display device for a camera in which light emitting diodes or the like are employed to display or indicate a shutter speed in the viewfinder of the camera.

Devices for activating a common anode or cathode light emitting diode array and for activating light emitting diodes arranged in matrix form, as in Japanese Laid-Open Patent Application No. 129227/1976 have been proposed as display devices for displaying a shutter speed set in a camera in a manual exposure time control mode or for indicating whether a shutter speed has been correctly set or not. The first-mentioned device is disadvantageous in that the number of light emitting diode terminals is considerably large while the second is disadvantageous in that, in order to indicate whether or not the shutter speed is correctly set, it is necessary to provide an additional light emitting diode and to turn it on or to cause it to flicker.

Accordingly, an object of the invention is to eliminate the above-described difficulties accompanying a conventional display device.

FIG. 1 is a sectional view of a portion of a viewfinder adapted to display shutter speeds with light emitting diodes. FIGS. 2 and 3 are circuit diagrams showing the conventional connections of light emitting diodes.

As shown in FIG. 1, numerals 2 indicative of exposure times are arranged in a viewfinder 1 with light emitting diodes $L_1$ through $L_{16}$ disposed adjacent corresponding ones of the numerals 2.

In FIG. 2, all of the anode terminals A of light emitting diodes $L_1$ through $L_{16}$ are connected together. The cathode terminals of the light emitting diodes $L_1$ through $L_{16}$ are designated by reference characters B, C, . . . and Q, respectively. When a negative voltage is applied to the cathode terminal G and a positive voltage is applied to the anode terminal A, the light emitting diode $L_6$ is activated causing it to emit light so that a shutter speed 1/125 sec is indicated. If the light emitting diodes are operated in such a manner that, in a manual photographing operation, the light emitting diode $L_1$ is caused to flicker or to be activated to indicate over-exposure and the light emitting diode $L_{16}$ is caused to flicker or be activated to indicate under-exposure and the light emitting diodes $L_1$ and $L_{16}$ are turned off and only a single light emitting diode corresponding to a manually selected shutter speed is turned on when a correct exposure setting is obtained, then the light emitting diodes can serve as a manual exposure meter. However, the arrangement of light emitting diodes shown in FIG. 2 is disadvantageous in that, as there are a large number of light emitting diode terminals, it is necessary for a circuit driving the light emitting diodes to have a corresponding large number of pins resulting in a high manufacturing cost and a low dependability of the camera.

In order to eliminate the above-described difficulty, a display circuit as shown in FIG. 3 has been proposed as disclosed in Japanese Laid-Open Patent Application No. 129227/1976 and in U.S. Pat. No. 4,096,494 assigned to the assignee of the present application. In FIG. 3, a decoder and driver circuit 3 is made up of inverter circuits 5 through 8, AND gates 9 through 12 and OR gates 13 through 16, and a display unit 4.

The operation of the display circuit in FIG. 3 will be described. The relationships between four bit inputs R, S, T and U and the outputs $V_4$, $V_3$, $V_2$ and $V_1$ of the AND gates 9, 10, 11 and 12 and the outputs $W_1$, $W_2$, $W_3$ and $W_4$ of the OR gates 13, 14, 15 and 16 are indicated in a function table in FIG. 4. For instance, when the inputs R, S, T and U are at "1", "0", "1" and "0", respectively ("1" being a logic high level and "0" being a logic low level), the outputs $V_1$, $V_2$, $V_3$ and $v_4$ of the AND gates are at "0", "0", "1" and "0", respectively, and the outputs $W_1$, $W_2$, $W_3$ and $W_4$ or the OR gates are at "1", "1", "0" and "1", respectively. That is, in this case, the outputs $V_3$ and $W_3$ are at "1" and "0", respectively, and therefore only the light emitting diode $L_6$ is turned on.

This display circuit is disadvantageous in that it can activate only one light emitting diode at a time and cannot perform the desired functions of a manual exposure meter in which a light emitting diode indicating correct exposure or a light emitting diode indicating whether a set exposure time is suitable or not as well as a light emitting diode corresponding to a manually set exposure time are simultaneously activatable.

SUMMARY OF THE INVENTION

In view of the foregoing, an object of the present invention is to provide a shutter speed display device in which light emitting diodes arranged in the form of a matrix are driven in a time division manner to cause a plurality of light emitting diodes to turn on or flicker so that the light emitting diodes perform the desired functions of a manual exposure meter.

In accordance with this and other objects of the invention, there is provided a shutter speed display device for a camera including a display unit having a plurality of light emitting elements each of which has an anode and a cathode terminal. The light emitting elements may, for instance, be light emitting diodes. The light emitting elements are provided in a viewfinder of a camera with one of the emitting elements corresponding to each of a plurality of shutter speed indicating numerals. Also, a light emitting element can be provided for indicating over-exposure and under-exposure conditions. The light emitting elements are divided into a predetermined number of ordered light emitting elements, that is, the light emitting elements are arranged in an ordered sequence. Like-ordered ones of the other of the anodes and cathodes of the light emitting elements are coupled among all of the groups. A decoder and driver circuit is provided for driving the display unit. A logic circuit applies digital data corresponding to a shutter speed to be displayed to the decoder and driver circuit in a time division manner.

BRIEF DESCRIPTION OF THE DRAWINGS

FIG. 1 is a plan view showing a viewfinder of a camera in which exposure times are displayed;

FIGS. 2 and 3 are circuit diagrams showing conventional light emitting diode circuits;

FIG. 4 is a function table for a description of the operation of the circuit of FIG. 3;

FIG. 9 is timing diagrams illustrating operations of the first and second embodiments of the shutter speed display device of the invention.

DESCRIPTION OF THE PREFERRED EMBODIMENTS

The invention will be described with reference to the accompanying drawings.

Figure 3:
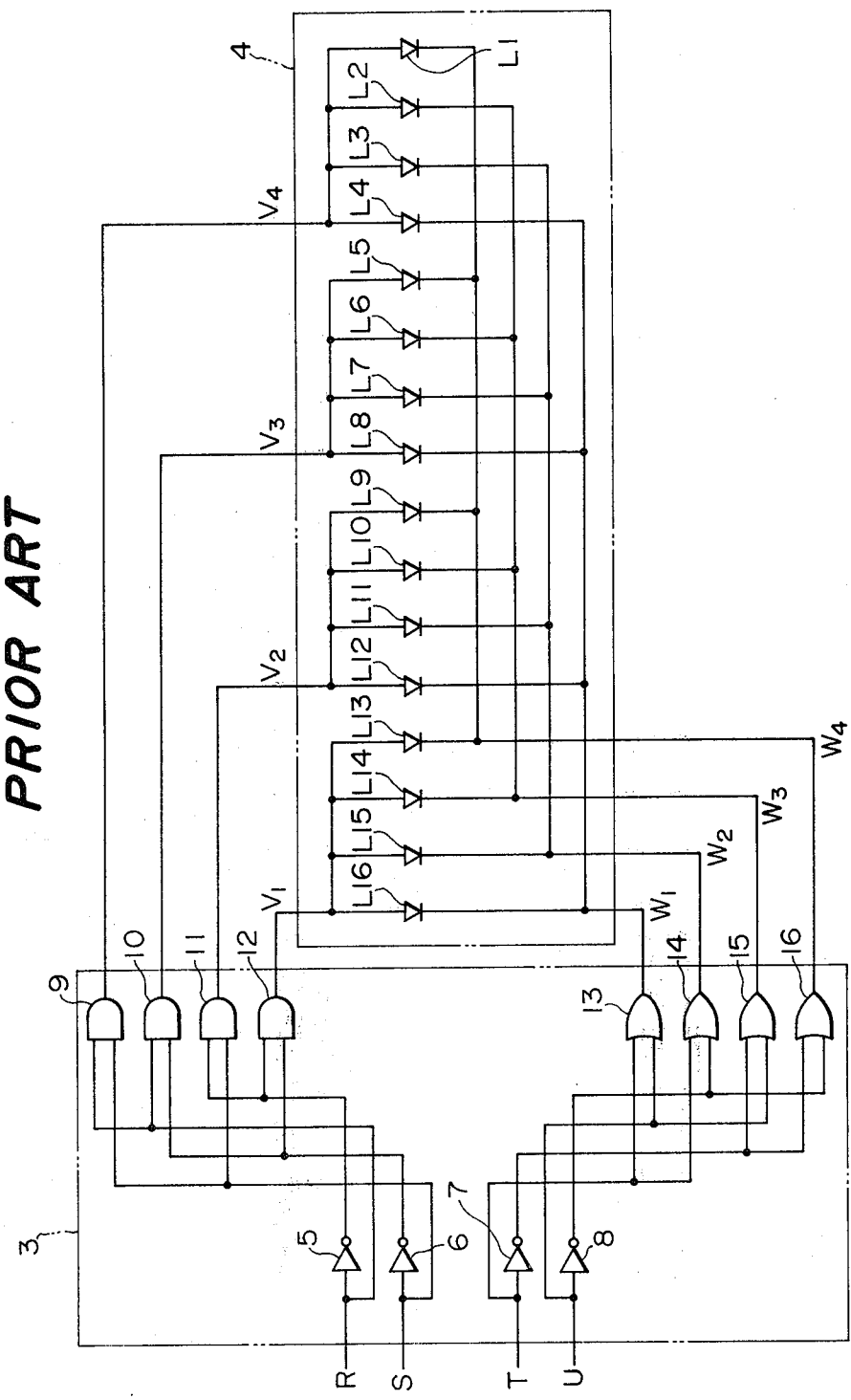
Figure 5:
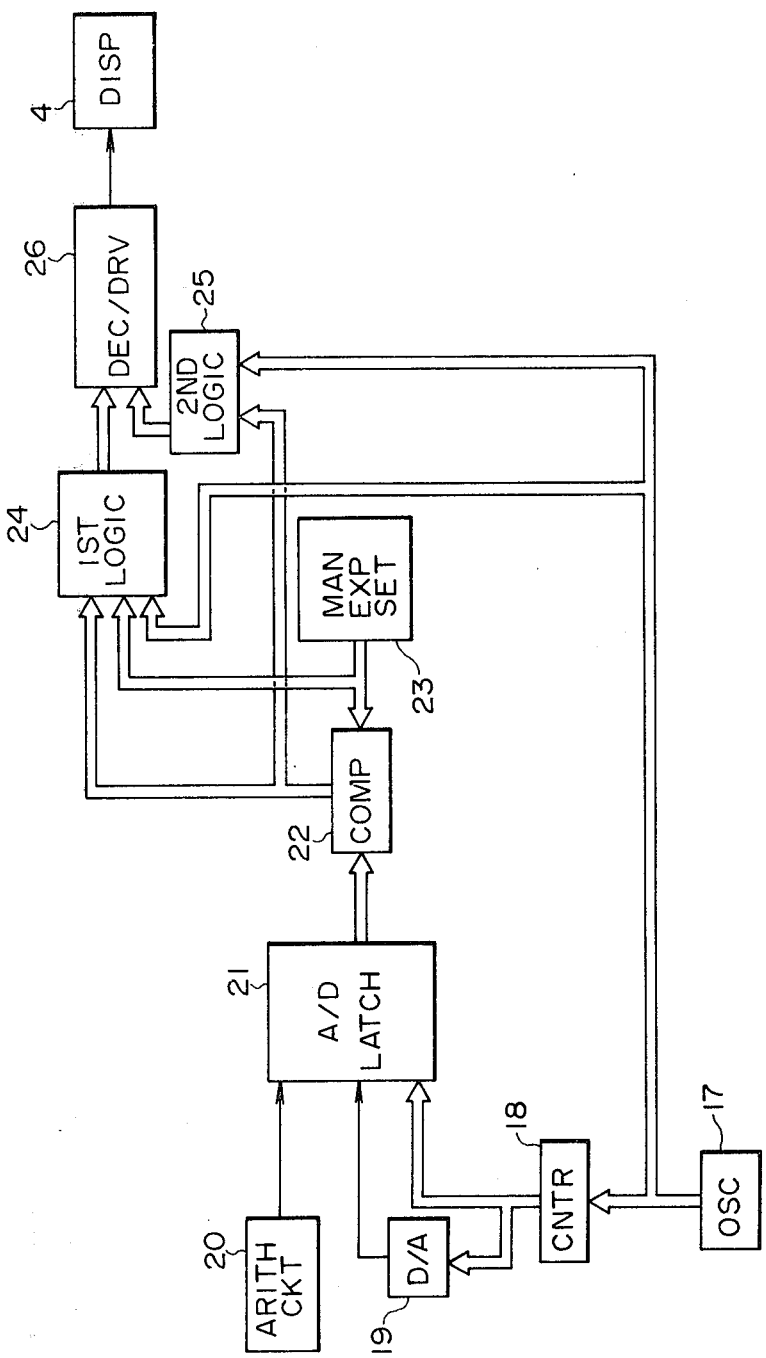
FIGS. 5 and 7 are block diagrams showing first and second embodiments of a shutter speed display device construcred according to the invention.

A first embodiment of a shutter speed display device constructed according to the invention is shown in FIG. 5. In FIG. 5, an oscillator circuit 17 generates clock pulses which are counted by a counter 18. The output of the counter 18 is applied to a D/A (digital-to-analog) converter circuit 19. The output of the counter 18 is further applied to an A/D (analog-to-digital) converter and latch circuit 21 to which the output of the D/A converter circuit 19 and the output of an arithmetic circuit 20 are applied. The output of the A/D converter and latch circuit 21 and the output of a manual exposure time setting circuit 23 are applied to a digital comparator circuit 22. The outputs of the digital comparator circuit 22, the manual exposure time setting circuit 23 and the oscillator circuit 17 are applied to a first logic circuit 24. The output of the digital comparator circuit 22 is further applied to a second logic circuit 25 to which the output of the oscillator circuit 17 is applied. The outputs of the two logic circuits 24 and 25 are applied through a decoder and driver circuit 26 to a display unit 4.

Figure 6:
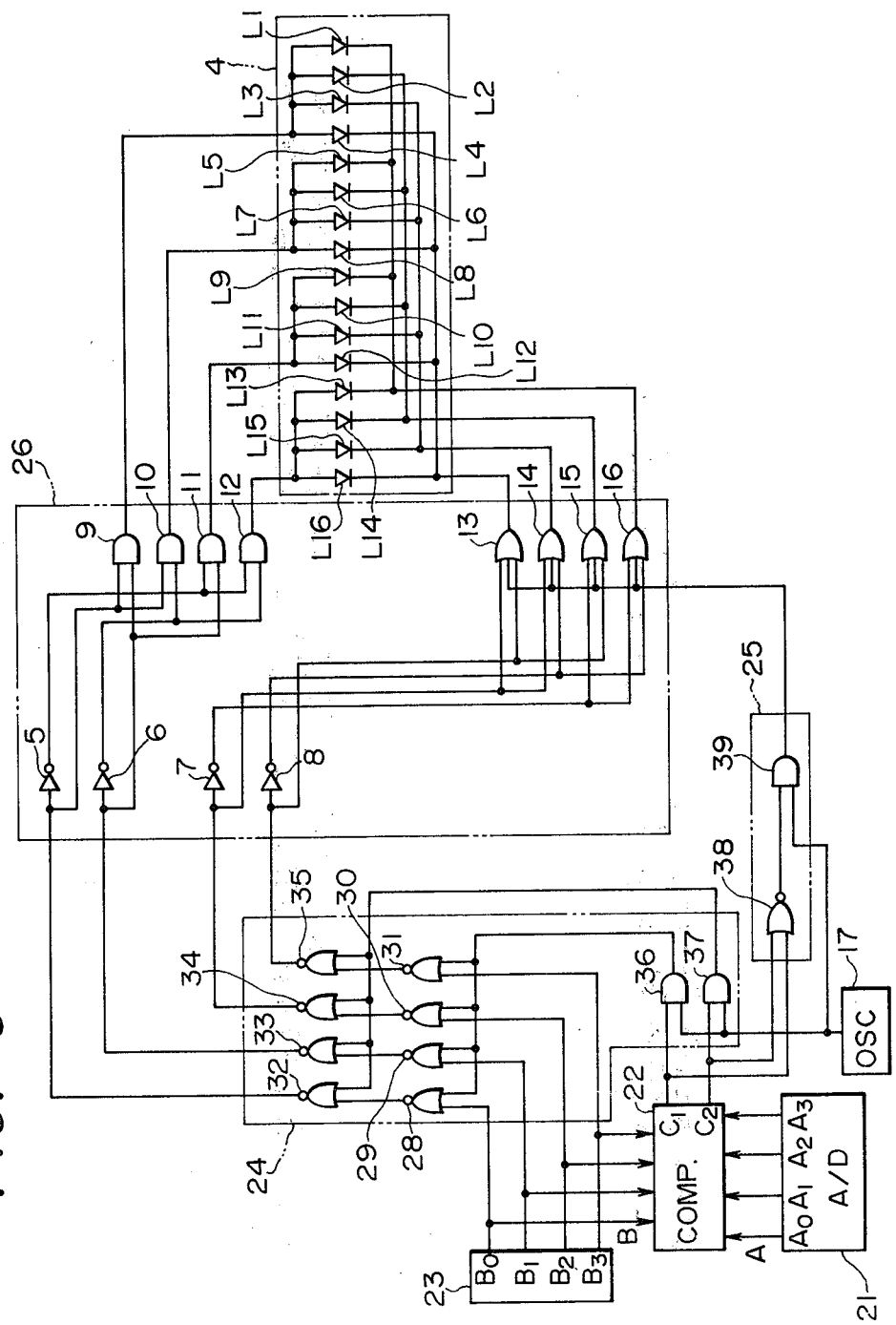
FIGS. 6 and 8 are schematic diagrams showing specifically the circuits of FIGS. 5 and 7, respectively.

The operation of the shutter speed display device thus constructed will be described with reference to FIG. 6 in more detail. FIG. 6 shows specific examples of the A/D converter and latch circuit 21, the digital comparator circuit 22, the manual exposure time setting circuit 23, the first logic circuit 24, the second logic circuit 25, and the decoder and driver circuit 26 in FIG. 5.

The output of the oscillator circuit 17 is applied to the counter 18 and the contents of the counter 18 are applied to the D/A converter circuit 19. The outputs of the arithmetic circuit 20, the counter 18 and the D/A converter circuit 19 are applied to the A/D converter and latch circuit 21. By a circuit operation as described, for instance, in the specification of Japanese Laid-Open Patent Application No. 56924/1977, the output of the arithmetic circuit 20 is subjected to analog-to-digital conversion and latched as a result of which a four-bit digital output $A_0$, $A_1$, $A_2$, $A_3$, corresponding to bits at positions $2^0$, $2^1$, $2^2$ and $2^3$, respectively, is produced. Also, a four-bit digital output $B_0$, $B_1$, $B_2$, $B_3$, corresponding to bits at positions $2^0$, $2^1$, $2^2$ and $2^3$, respectively, is produced corresponding to a selected shutter speed at the output of the manufactural exposure time setting circuit 23.

The four-bit digital data A ($A_0$, $A_1$, $A_2$, $A_3$) outputted by the A/D converter and latch circuit 21 is compared with the output digital data B ($B_0$, $B_1$, $B_2$, $B_3$) from the manual exposure time setting circuit 23 by the digital comparator circuit 22 which determines whether $A>B$, $A<B$ or $A=B$. If $A>B$, the outputs $C_1$ and $C_2$ from the digital comparator circuit 22 are set to "1" and "0", respectively, and the outputs of a NOR gate 38 and an AND gate 39 are set to "0". When, under this condition, the output of the oscillator circuit 17 is at "1", the outputs of AND gates 36 and 37 are at "1" and "0", respectively. Therefore, all of the outputs of NOR gates 28 through 31 are at "0". Accordingly, irrespective of the digital output of the manual exposure time setting circuit 23, all of the outputs of NOR gates 32 through 35 are raised to "1". These outputs, forming the output of the first logic circuit 24, are applied to the decoder and driver circuit 26 constituted by inverters 5 through 8, AND gates 9 through 12 and OR gates 13 through 16, while the output of the AND gate 39 in the second logic circuit is applied to the OR gates 13 through 16. The output of the AND gate 39 is at "0" and hence has no effect. A light emitting diode $L_1$ which indicates overexposure is then turned on as in the case of FIG. 4.

When the output of the oscillator circuit 17 is at "0", the outputs of the AND gates 36 and 37 are at "0". Therefore, four bits, for instance, "1 0 1 0", which were manually set, are gated through directly to the outputs of the NOR gates 32, 33, 34 and 35 and are applied to the inverter circuits 5 through 8, respectively. The output of the AND gate 39 is applied to the OR gates 13 through 16. In this case, the output of the AND circuit 39 is at "0". Therefore, one of the light emitting diodes, for instance $L_6$, is turned on similarly to the case of FIG. 4.

In the described manner, the light emitting diodes $L_1$ and $L_6$ are turned on, respectively, when the output of the oscillator circuit 17 is at "1" and "0". If the oscillation frequency of the oscillator circuit 17 is sufficiently high, the operator perceives the two light emitting diodes as if they were continuously turned on.

In the case of $A<B$, the outputs $C_1$ and $C_2$ of the digital comparator circuit 22 are at "0" and "1", respectively, and the outputs of the NOR gate 38 and the AND gate 39 are at "0". If, in this state, the output of the oscillator circuit 17 is at "1", the outputs of the AND gates 36 and 37 are at "0" and "1", respectively. The "1" output of the AND gate 37 is applied to the NOR gates 32 through 35. Therefore, irrespective of the state of the digital output of the manual exposure time setting circuit 23, all of the outputs of the NOR gates 32 through 35 are at "0". The outputs of the NOR gates 32 through 35 are applied to the decoder and driver circuit 26 and the output "0" of the AND gate 39 is applied to the OR gates 13 through 16. Thus, a light emitting diode $L_{16}$ which indicates under-exposure is turned on similar to the case of FIG. 4.

When the output of the oscillator circuit 17 is at "0", the outputs of the AND gates 36 and 37 are at "0". Therefore, the manually set four bits, for instance "1 0 1 0", are gated through directly to the outputs of the NOR gates 32 through 35 as a result of which a light emitting diode (for instance $L_6$) corresponding to the code indicated by the four bits is turned on. In other words, in the case of $A<B$, the light emitting diodes $L_6$ and $L_{16}$ are alternately turned on.

In the case of $A=B$, the outputs of the AND gates 36 and 37 are both at "0". Therefore, the four-bit digital output, for instance "1 0 1 0" of the manual exposure time setting circuit 23 is provided at the outputs of the NOR gates 32, 33, 34 and 35 so that the light emitting diode $L_6$ is selected. However, as the output of the NOR gate 38 is "1", when the output of the oscillator circuit 17 is at "1" the output of the AND gate 39 is raised to "1" and therefore the outputs of the OR gates 13 through 16 are also raised to "1". Accordingly, none of the light emitting diodes are turned on. On the other hand, when the output of the oscillator circuit 17 is at "0", the output of the AND gate 39 is "0" and therefore, similar to the case of $A>B$, the light emitting diode $L_6$ is turned on. In other words, when the exposure is correct, only the light emitting diode $L_6$ is alternately turned on and off. If the oscillation frequency is sufficiently high, the diode will appear to the operator as if it were continuously turned on.

Figure 7:
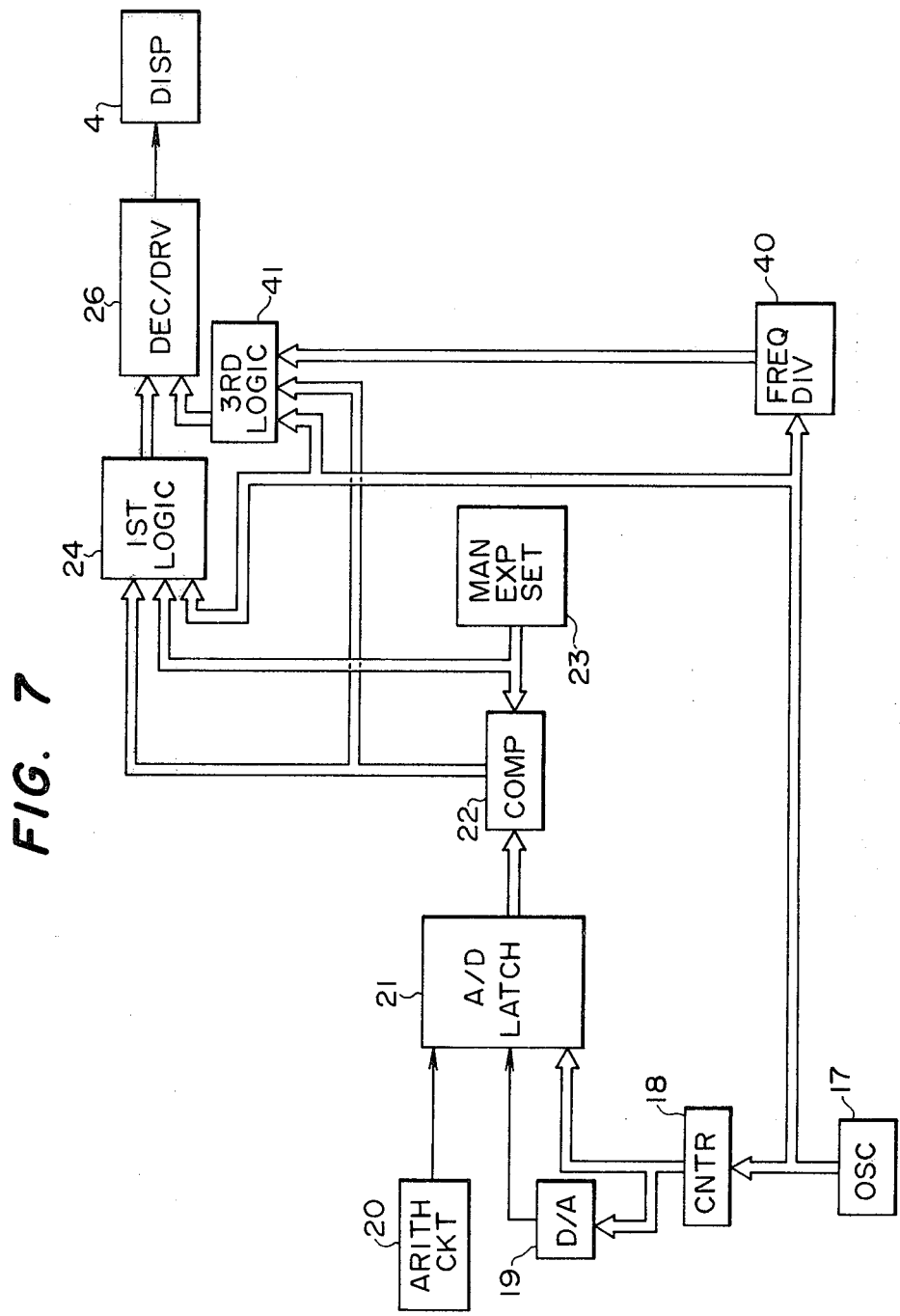

A second example of a shutter speed display device constructed according to the invention is shown in FIG. 7 in which circuit elements 17 through 24 are the same as those similarly numbered in the first-described embodiment.

The output of the oscillator circuit 17 is applied to a frequency divider circuit 40 the output of which is applied to a third logic circuit 41 to which the outputs of the digital comparator circuit 22 and the oscillator circuit 17 are applied. The outputs of the third logic circuit 41 and the first logic circuit 24 are applied to the decoder and driver circuit 26 which drives the display unit 4.

Figure 8:
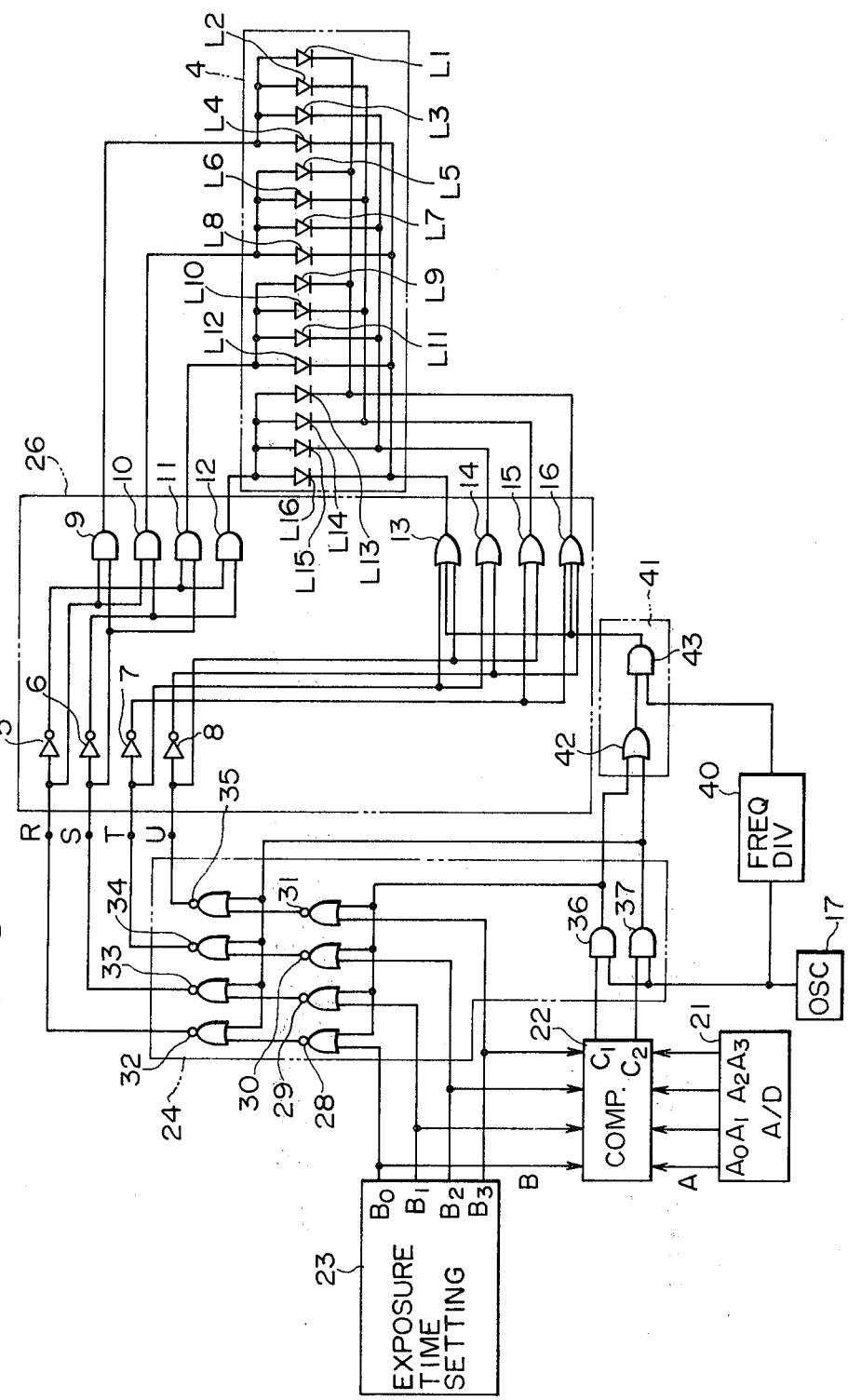

The operation of the shutter speed display device thus constructed will be described with reference to FIG. 8 which is a schematic circuit diagram showing the circuit of FIG. 7 more specifically. As in the first embodiment, four-bit digital data A ($A_0$, $A_1$, $A_2$, $A_3$) provided by the A/D converter and latch circuit 21 is compared with digital data B ($B_0$, $B_1$, $B_2$, $B_3$) outputted by the manual exposure time setting circuit 23 by the digital comparator circuit 22 as a result of which a determination is made as to whether $A>B$, $A<B$, $A=B$.

In the case of $A>B$, the outputs $C_1$ and $C_2$ of the digital comparator circuit 22 are at "1" and "0", respectively. When, in this state, the output of the oscillator circuit 17 is at "1", the outputs of the AND gates 36 and 37 are "1" and "0", respectively. Therefore, similar to the first embodiment, all of the outputs of the NOR gates 32, 33, 34 and 35 are at "1" irrespective of the digital output of the manual exposure time setting circuit 23. In this case, the output of an OR gate 42 is at "1". If the output of the frequency divider circuit 40 is at "1", then the output of an AND gate 43 is raised to "1" and accordingly the light emitting diode $L_1$ is not turned on. Only when the output of the frequency divider circuit 40 is "0" will the light emitting diode $L_1$ be turned on.

When the output of the oscillator circuit 17 is set to "0", the output of the AND gates 36 and 37 are also at "0" and therefore the output of the manual exposure time setting circuit 23 is gated directly to the outputs of the NOR gates 32, 33, 34 and 35. Accordingly, the output of the AND gate 43 is set to "0" and the light emitting diode $L_6$ is turned on.

Thus, the light emitting diode $L_6$ is continuously switched between on and off states while the light emitting diode $L_1$ is switched on and off only when the output of the frequency divider circuit 40 is at "0". If the oscillation frequency of the oscillator circuit 17 is properly chosen, the operator will perceive the light emitting diode $L_6$ as if it were continuously turned on while the light emitting diode $L_1$ flickers.

In the case of $A<B$, the outputs $C_1$ and $C_2$ of the digital comparator circuit 22 are "0" and "1", respectively.

Accordingly, when in this state, the output of the oscillator circuit 17 is at "1", the outputs of the AND gates 36 and 37 are "0" and "1", respectively. Therefore, all of the outputs of the NOR gates 32, 33, 34 and 35 are at "0" irrespective of the output of the manual exposure time setting circuit 23. In this case, the output of the OR gate 42 is at "1". If the output of the frequency divider circuit 40 is at "1", the output of the AND gate 43 is raised to "1" and the light emitting diode $L_{16}$ is not turned on. Only when the output of the frequency divider circuit 40 is at "0" will the light emitting diode $L_{16}$ be turned on.

When the output of the oscillator circuit 17 changes from "1" to "0", the outputs of the AND gates 36 and 37 are both "0". Therefore, the output of the manual exposure time setting circuit 23 is gated directly through to the outputs of the NOR gates 32 through 35 and the output of the AND gate 43 is "0". Therefore, the light emitting diode L is switched off and on continuously while the light emitting diode $L_{16}$ is switched off and on only when the output of the frequency divider circuit 40 is at "0". Therefore, if the oscillation frequency is properly chosen, the light emitting diode $L_6$ will be perceived as if it were continuously turned on while the light emitting diode $L_{16}$ flickers.

In the case of $A=B$, both of the outputs $C_1$ and $C_2$ of the digital comparator circuit 22 are "0". Therefore, the outputs of the AND gates 36, 37 and 43 and the OR gate 42 are at "0". The output of the manual exposure time setting circuit 23 appears at the outputs of the NOR gates 32 through 35. Therefore, only the light emitting diode $L_{16}$ is continuously turned on.

FIG. 9 is a timing diagram relating to the operations of the first and second embodiments described above. As described above, according to the invention, the light emitting diodes arranged in matrix form are driven in a time division manner by the drive circuit so that, in the event of incorrect exposure, a light emitting diode corresponding to a set shutter speed is turned on while the light emitting diode corresponding to over-exposure or under-exposure is turned on or caused to flicker, while for correct exposure the light emitting diode corresponding to over-exposure to under-exposure is turned off while only a light emitting diode corresponding to a selected exposure time is turned on. Therefore, the light emitting diodes performs the functions of a manual exposure meter. In addition, it is unnecessary to provide light emitting diodes for an exposure meter and the number of pins needed for manufacturing the circuit in the form of an integrated circuit is reduced which contributes effectively to reducing the manufacturing cost and improving the reliability of a camera utilizing the invention.

What is claimed is:

1. A shutter speed display device for a camera comprising: a display unit having a plurality of light emitting display elements, each having an anode and a cathode, which are provided respectively corresponding to a plurality of shutter speed indicating numerals in a viewfinder of said camera, said light emitting elements being divided into a predetermined number of groups of ordered light emitting elements, one of said anodes and cathodes of said light emitting elements in each group being connected together, the other of said anodes and cathodes of said light emitting elements in each of said groups being connected to the other of said anodes and cathodes of like-ordered ones of said light emitting elements in the other of said groups; a decoder and driver circuit means for driving said display unit; oscillator circuit means providing a periodic clock signal alternating between a first state and a second state; and logic circuit means, coupled between said oscillator circuit means and said decoder and driver circuit means, responsive to said clock signal for alternately applying to said decoder and driver circuit means in a time division manner (1) a first signal representing a manually set shutter speed and (2) a second comparison signal representing the value of said set shutter speed relative to a calculated correct value of shutter speed, whereby a corresponding one of a first set of said display elements indicates the set shutter speed when said first signal is applied, and whereby, when said second signal is applied, another one of a second set of two predetermined display elements indicates whether the set shutter speed value is above or below said calculated value.

2. The shutter speed device of claim 1 further comprising comparator means, coupled to said logic circuit means, for comparing a digital number representing said manually set shutter speed with a digital number representing said calculated value of shutter speed and producing said second comparison signal.

3. The shutter speed device of claim 1 or 2 further comprising means coupled to said oscillator circuit means and responsive to said second signal for causing said two predetermined display elements to flicker.

4. A shutter speed display device for a camera comprising: a display unit having a plurality of light emitting elements, each having an anode and a cathode, which are provided respectively corresponding to a plurality of shutter speed indicating numerals in a viewfinder of said camera, said light emitting elements being divided into a predetermined number of groups of ordered light emitting elements, one of said anodes and cathodes of said light emitting elements in each group being connected together, the other of said anodes and cathodes of said light emitting elements in each of said groups being connected to the other of said anodes and cathodes of like-ordered ones of said light emitting elements in the other of said groups; a decoder and driver circuit for driving said display unit; and logic circuit means for applying digital data corresponding to a shutter speed to be displayed to said decoder and driver circuit in a time division manner; wherein said logic circuit means comprises a digital comparator operatively coupled to compare a digital number representing a manually-set exposure condition with a digital number representing a calculated exposure condition, said comparator means producing first and second output signals representative of whether said digital number representing said manually-set exposure condition is equal to, less than, or greater than said calculated digital number; first and second AND gates, said first AND gate having a first input coupled to receive said first output signal and said second AND gate having a first input coupled to receive said second output signal; an oscillator circuit having an output coupled to second inputs of both said first and second AND gates; a first set of NOR gates, each of said NOR gates of said first set of NOR gates having a first input coupled to an output of said first AND gate and each having a second input coupled to a corresponding bit of said digital number representing said manually-set exposure condition; a second set of NOR gates, each NOR gate of said second set of NOR gates having a first input coupled to an output of said second AND gate and a second input coupled to an output of a corresponding NOR gate of said first set of NOR gates; a NOR gate having a first input coupled to receive said first output signal and a second input coupled to receive said second output signal of said comparing means; and a third AND gate having a first input coupled to an output of said NOR gate having said inputs coupled to receive said first and second output signals of said comparing means and a second input coupled to said output of said oscillator.

5. The shutter speed display device of claim 1 wherein one of said light emitting elements is provided for indicating an over-exposed condition and one of said light emitting elements is provided for indicating an under-exposed condition.

6. The shutter speed display device of claim 5 or 2 further comprising a frequency divider circuit coupled between said output of said oscillator and said second input of said third AND gate.

7. The shutter speed display device of claim 6 wherein said decoder and driver circuit comprises a first plurality of inverter circuits having inputs coupled to corresponding outputs of first ones of said NOR gates of said second set of NOR gates; a second plurality of inverter circuits having inputs coupled to corresponding ones of other ones of said second set of NOR gates; a plurality of AND gates, one of said AND gates being provided for each of said gates of light emitting elements, each of said AND gates having an output coupled to said one of said anodes and cathodes of said light emitting elements of the corresponding group of light emitting elements and first and second inputs coupled to selected ones of inputs of said first plurality of inverter circuits and outputs of said first plurality of inverter circuits wherein each of said AND gates receives a different set of inputs; a plurality of OR gates, the number of said OR gates being equal to the number of light emitting elements in each of said groups, each of said OR gates having an output coupled to like-ordered ones of said light emitting elements in each of said groups, each of said OR gates having a first input coupled to an output of said third AND gate, and first and second inputs coupled to ones of said inputs of said second plurality of inverter circuits and outputs of said second plurality of inverter circuits wherein each of said OR gates receives a different set of inputs.

8. The shutter speed display device of claims 5 or 2 wherein said decoder and driver circuit comprises a first plurality of inverter circuits having inputs coupled to corresponding outputs of first ones of said NOR gates of said second set of NOR gates; a second plurality of inverter circuits having inputs coupled to corresponding ones of other ones of said second set of NOR gates; a plurality of AND gates, one of said AND gates being provided for each of said groups of light emitting elements, each of said AND gates having an output coupled to said one of said anodes and cathodes of said light emitting elements of the corresponding group of light emitting elements and first and second inputs coupled to selected ones of inputs of said first plurality of inverter circuits and outputs of said first plurality of inverter circuits wherein each of said AND gates receives a different set of inputs; a plurality of OR gates, the number of said OR gates being equal to the number of light emitting elements in each of said groups, each of said OR gates having an output coupled to like-ordered ones of said light emitting elements, in each of said groups, each of said OR gates having a first input coupled to an output of said third AND gate, and first and second inputs coupled to ones of said inputs of said second plurality of inverter circuits and outputs of said second plurality of inverter circuits wherein each of said OR gates receives a different set of inputs.

* * * * *